(12) United States Patent  
Dutta

(10) Patent No.: US 9,124,504 B2
(45) Date of Patent: Sep. 1, 2015

(54) SYSTEM AND METHOD FOR IMPLEMENTING LABEL SWITCH ROUTER (LSR) OVERLOAD PROTECTION

(71) Applicant: Pranjal K. Dutta, Mountain View, CA (US)

(72) Inventor: Pranjal K. Dutta, Mountain View, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 104 days.

(21) Appl. No.: 13/856,624

(22) Filed: Apr. 4, 2013

(65) Prior Publication Data

US 2013/0265871 A1    Oct. 10, 2013

Related U.S. Application Data

(60) Provisional application No. 61/620,279, filed on Apr. 4, 2012.

(51) Int. Cl.
*H04L 1/00* (2006.01)
*H04L 12/801* (2013.01)
*H04L 12/723* (2013.01)
*H04L 12/703* (2013.01)

(52) U.S. Cl.
CPC ............. *H04L 47/12* (2013.01); *H04L 45/28* (2013.01); *H04L 45/507* (2013.01)

(58) Field of Classification Search
CPC ........ H04L 45/28; H04L 45/507; H04L 47/12

USPC .......................................................... 370/231
See application file for complete search history.

(56) References Cited

U.S. PATENT DOCUMENTS

| | | | |
|---|---|---|---|
| 2003/0158965 A1* | 8/2003 | Koester ...................... | 709/239 |
| 2005/0007954 A1* | 1/2005 | Sreemanthula et al. ...... | 370/229 |
| 2010/0309919 A1 | 12/2010 | Filsfils et al. | |
| 2011/0141891 A1 | 6/2011 | So | |
| 2011/0142046 A1 | 6/2011 | Guichard et al. | |
| 2011/0211579 A1* | 9/2011 | Cao et al. ...................... | 370/392 |

FOREIGN PATENT DOCUMENTS

| | | |
|---|---|---|
| EP | 2 068 511 A1 | 6/2009 |
| EP | 2 337 301 A1 | 6/2011 |

OTHER PUBLICATIONS

Jul. 10, 2013 The International Search Report and the Written Opinion of the International Searching Authority, or The Declaration in PCT/US2013/035246, Alcatel-Lucent USA Inc., Applicant, 12 pages.
Office Action received in corresponding Japanese Application No. 2014-7027870, dated Mar. 24, pp. 1-6.

\* cited by examiner

*Primary Examiner* — Sai-Ming Chan
(74) *Attorney, Agent, or Firm* — Wall & Tong, LLP

(57) ABSTRACT

A method and apparatus for implementing Label Information Base (LIB) overload protection for a respective Forwarding Equivalency Class (FEC) type associated with a Label Switched Path (LSP).

25 Claims, 4 Drawing Sheets

SYSTEM AND METHOD FOR IMPLEMENTING LABEL SWITCH ROUTER (LSR) OVERLOAD PROTECTION

CROSS-REFERENCE TO RELATED APPLICATION

This application claims the benefit of U.S. Provisional Patent Application Ser. No. 61/620,279, filed Apr. 4, 2012, entitled SYSTEM, METHOD AND APPARATUS FOR IMPROVED MPLS, which application is incorporated herein by reference in its entirety.

FIELD OF THE INVENTION

The invention relates to the field of communication networks such as multi-protocol label switching (MPLS) networks and, more particularly but not exclusively, to overload protection thereof.

BACKGROUND

Multiprotocol Label Switching (MPLS) enables efficient delivery of a wide variety of differentiated, end-to-end services. The Internet Engineering Task Force (IETF) describes an architecture for Multiprotocol Label Switching (MPLS) in its Request for Comment (RFC) document denoted as RFC 3031, and entitled "Multiprotocol Label Switching Architecture."

A fundamental concept in MPLS is that two Label Switching Routers (LSRs) must agree on the meaning of the labels used to forward traffic between and through them. This common understanding is achieved by using a set of procedures, called a label distribution protocol, by which one Label Switch Router (LSR) informs another of label bindings it has made.

SUMMARY

Various deficiencies in the prior art are addressed by methods and apparatus for providing LDP LSR overload protection, such as Label Information Base (LIB) overload protection for a respective Forwarding Equivalence Class (FEC) type associated with a Label Switched Path (LSP).

Generally speaking, the operation of downstream LSR in a network is adapted to indicate that an overload condition for a respective FEC type occurs warranting the suspension of transmission of further label mappings for the specified type.

A method according to one embodiment for implementing an overload protection mechanism at a Label Switch Router (LSR) supporting one or more Label Switched Paths (LSPs comprises, in response to a determination that an overload threshold parameter associated with any of a data plane resource or a LIB (Label Information Base) resource, propagating toward downstream LSRs of said LSP a Label Distribution Protocol (LDP) message adapted to stop new label transmissions associated with said data plane resource or LIB resource.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
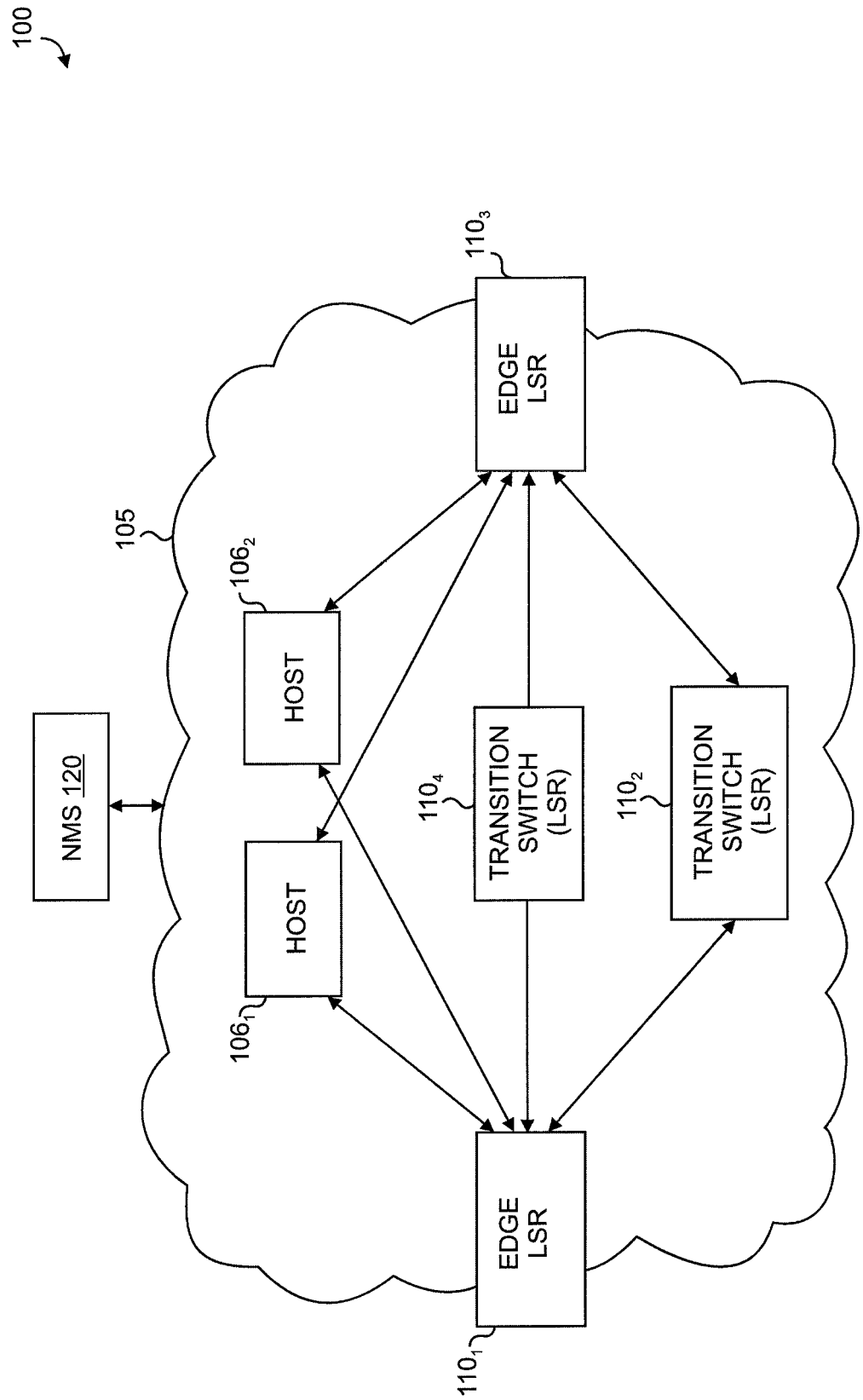
FIG. 1 depicts an exemplary network benefiting from the various embodiments.

Various embodiments will be described within the context of a network supporting Multi-Protocol Label switching, such as defined in Internet Engineering Task Force (IETF) Requests for Comment (RFC) 3031 and 5036, each of which is incorporated by reference in its respective entirety.

Various embodiments provide mechanisms by which a Label Switched Router (LSR) may protect itself from a "LSR Overload" condition in which the Label Information Base (LIB) of the LSR is overloaded due to the operation of peering LSRs.

LDP (Label Distribution Protocol) is a signaling protocol for set up and maintenance of MPLS LSPs (Label Switched Paths), and for distributing labels for setting up LSPs. LDP comprises a set of procedures and messages by which Label Switch Routers (LSRs) establish Label Switched Paths (LSPs) through a network by mapping network-layer routing information directly to data-link layer switched paths, i.e., the LSPs. These LSPs may have an endpoint at a directly attached neighbor (comparable to IP hop-by-hop forwarding), an endpoint at a network egress node enabling thereby label switching via all intermediary nodes and the like.

LDP associates a Forwarding Equivalence Class (FEC) with each LSP it creates. The FEC associated with an LSP specifies which packets are "mapped" to that LSP. This FEC is the "context" of a label. LSPs are extended through a network as each LSR "splices" incoming labels for a FEC to the outgoing label assigned by the next hop for the given FEC.

IETF RFC5036 defines two label advertisement modes that may be associated with a peering LSR—Downstream On Demand (DoD) and Downstream Unsolicited (DU) mode. When an LDP session is operating in DU label advertisement mode, the downstream LSR is responsible for advertising a label mapping when it wants an upstream LSR to use the label, regardless of whether upstream wants to use the label or not for forwarding traffic.

RFC3031 defines two label retention modes in general for MPLS—Liberal Label Retention and Conservative Label Retention. When using Liberal Label retention, every label mappings received from a peer LSR is retained regardless of whether the LSR is the next hop for the advertised mapping. The main advantage of Liberal Label Retention mode is that reaction to next-hop resolution changes can be quick because labels from peers already exist such that they can be programmed immediately into data plane. Many LDP based applications have been developed using Liberal Label Retention mode because it significant minimizes loss of data traffic and reduction of signaling overheads on next-hop changes. The main disadvantage of the Liberal Label Retention mode is that unneeded label mappings are distributed and maintained across all participating LSRs in the network.

When an LSR is operating in DS label advertisement mode and Liberal mode of label retention, a downstream LSR may generate high volume label mappings to distribute large number of FECs. Such a high volume may be also generated due to misconfiguration of any LSR in the network, and when all such LSRs are operating in DU label advertisement with liberal retention mode. LDP supports various FEC types and an implementation may allocate various resources in data plane for LSPs of each FEC type.

Flooding of label mappings from downstream LSR(s) may exhaust data plane resources in the upstream LSR for one or more FEC types. Such indiscriminate flooding may also cause Denial of Service (DoS) in the control plane of the upstream LSR such as exhaustion of all available memory in the Central Processing Unit (CPU) that implements control plane functionality of an LSR.

Such resource exhaustion conditions are generally referred to herein as "LSR Overload" and its significance is defined at a per-FEC type granularity. Further, a network operator may choose to limit the size of a Label Information Base (LIB) in a LSR at per FEC granularity level for various administrative reasons.

FIG. 1 depicts a high-level block diagram of a communication network benefiting from various embodiments. Specifically, the network 100 of FIG. 1 provides a Multi-Protocol Label Switching (MPLS) network supporting LDP LSR Overload Protection. The network may be modified by those skilled in the art to use other MPLS related protocols rather that the exemplary LDP protocol discussed herein, such as RSVP-TE. (Reservation Protocol—TE) as described in IETF RFC 3209 and related documents.

Network 100 includes an IP/MPLS communication network (CN) 105 and at least one network management system (NMS) 120 operative to, illustratively, route traffic between an originating Edge LSR 110-1 and a destination Edge LSR 110-3 via one or more label switched paths (LSPs).

As depicted, NMS 120 is operative to control a plurality of routers 110 forming the CN 105; namely, a plurality of Label Switched Routers (LSRs) 110-1 through 110-4. It will be noted that while only four LSRs are depicted, the CN 105 may include many more LSRs. Similarly, while only two hosts (106$_1$ and 106$_2$) are depicted, the CN 105 may include many more hosts. The representation of the CN 105 is simplified for purposes of this discussion.

The NMS 120 is a network management system adapted for performing the various management functions described herein. The NMS 120 is adapted to communicate with nodes of CN 105. The NMS 120 may also be adapted to communicate with other operations support systems (e.g., Element Management Systems (EMSs), Topology Management Systems (TMSs) and the like, as well as various combinations thereof).

The NMS 120 may be implemented at a network node, network operations center (NOC) or any other location capable of communication with the CN 105 and various elements related thereto. The NMS 120 may support user interface capabilities to enable one or more users to perform various network management, configuration, provisioning or control related functions (e.g., enter information, review information, initiate execution of various methods as described herein and the like). Various embodiments of the NMS 120 are adapted to perform functions as discussed herein with respect to the various embodiments. The NMS 120 may be implemented as a general purpose computing device or specific purpose computing device, such as described below with respect to FIG. 4 and various other figures.

In various embodiments, the NMS 120 and the various routers 110 operate to support, illustratively, LDP LSR Overload Protection. Specifically, as depicted in FIG. 1, a traffic stream (e.g., a video or other data stream) is communicated from a source Edge LSR 110-1 to a destination Edge LSR 110-3 via one or more label switched paths (LSPs). For example, one path originates at Edge LSR 110-1, traverses the core of CN 105 and terminates at Edge LSR 110-3.

As previously noted, when an LSR is operating in DS label advertisement mode and Liberal mode of label retention, the downstream LSR may generate high volume label mappings to distribute large number of FECs. Such a high volume may also be generated due to misconfiguration of any LSR in the network and when all such LSRs are operating in DU label advertisement with liberal retention mode. LDP supports various FEC types and an implementation may allocate various resources in data plane for LSPs of each FEC type. Flooding of label mappings from downstream LSR(s) may exhaust data plane resources in the upstream LSR for one or more FEC types. Such indiscriminate flooding may also cause Denial of Service (DoS) in the control plane of the upstream LSR such as exhaustion of all available memory in the Central Processing Unit (CPU) that implements control plane functionality of an LSR. Such resource exhaustion conditions and the like are denoted herein as "LSR Overload" conditions and have a significance at per-FEC type granularity. Further a network operator may choose to limit the size of LIB in a LSR at per FEC granularity level for various administrative reasons.

An LDP LSR implements various thresholds which, when Detective as being exceeded, indicate that the LSR is or is entering and overload condition. When an upstream LSR is overloaded for a FEC type, it notifies one or more downstream peer LSRs that it is overloaded for the FEC type. Various conditions may occur that cause an overload state to be indicated (set ON) in an upstream LSR. For example, data plane resources may be exhausted in an upstream LSR for the specific FEC type such that the upstream LSR generates and overload state ON indication. An operator may choose to limit the size of LIB in an upstream LSR for one or more specific FEC types by explicit configuration. When the LIB entries for the FEC type exceed such configured limitation or threshold, then the upstream LSR notifies downstream LSRs to indicate overload state ON for specific FEC type.

When a downstream LSR receives an overload status ON notification from an upstream LSR, it does not send further label mappings for specified FEC type. When a downstream LSR receives overload OFF notification from an upstream LSR, it sends pending label mappings to the upstream LSR for specified FEC type.

Overload TLV

Various embodiments use a new type-length-value (TLV) element denoted herein as a "LSR Overload" TLV suitable for enabling an upstream LSR to indicate an overload condition to downstream LSRs.

Figure 2A:
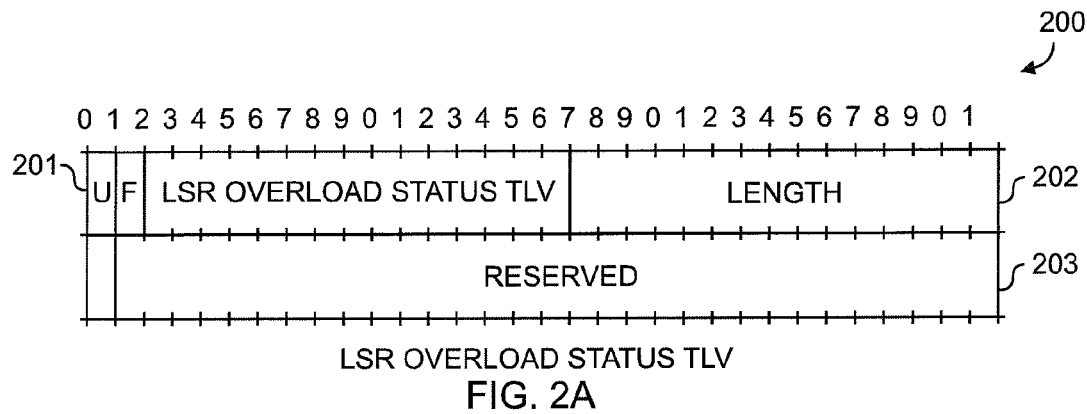
FIGS. 2A, 2B and 2C depict various overload encoded messages according to one embodiment.
Figure 2B:
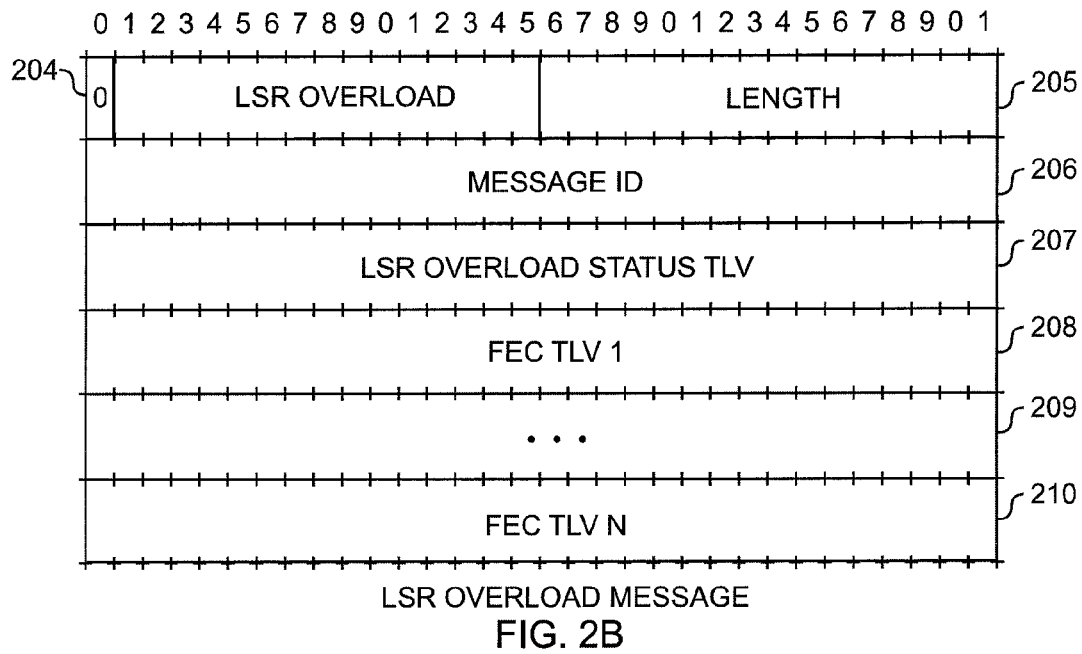
Figure 2C:
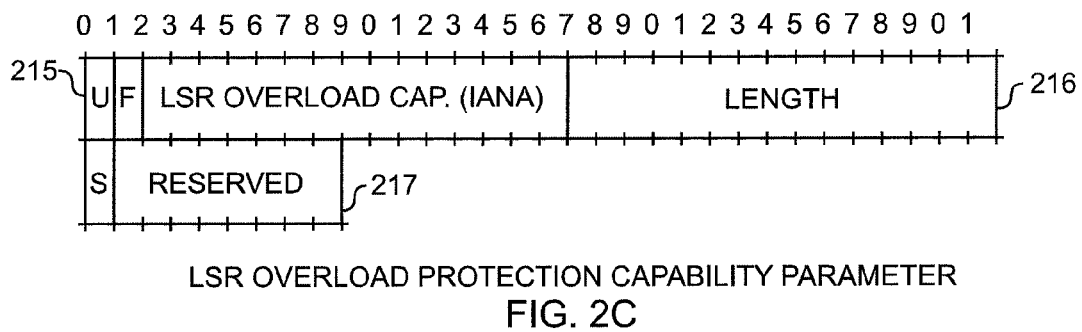

FIG. 2 depicts an exemplary format for an LSR Overload TLV suitable for use in various embodiments discussed herein. Specifically, FIG. 2 depicts an exemplary LSR Overhead Status TLV (FIG. 2A), an exemplary LSR Overload Message (FIG. 2B), and an exemplary LSR Overload Protection Capability Parameter (FIG. 2C).

FIG. 2A depicts a general format of an exemplary LDP Overload Status TLV format according to one embodiment.

A first field 201 includes a U-bit or Unknown TLV bit, such as described in RFC5036. This bit, when set to 1, indicates that a receiver should ignore the message if unknown to the receiver. Field 201 includes a F-bit or Forward unknown TLV bit such as described in RFC5036. This bit is set to 1 due to an LSR overload TLV, which condition is not forwarded, being sent only between two immediate LDP peers in various embodiments.

TLV Code Point of field 201 indicates the TLV type that identifies the LSR Overload Status TLV. An implementation can use a TLV Code Point for Vendor Specific Private TLV space as defined in RFC 5036. If this TLV is standardized for inter-operability among vendors then the code point can be allocated from IANA (Internet Assigned Naming Authority).

A second field 202 comprises a length field.

A third field 203 includes a S-bit or State bit, which indicates whether the sender is setting the LSR Overload Status ON or OFF. The State bit value is used as follows:

1—The TLV LSR overload status is ON.
0—The TLV LSR overload status is OFF.

In various embodiments, when an LSR generates LSR overload status, the LSR transmits LSR Overload Status TLV in a LDP Notification Message accompanied by a FEC TLV. The FEC TLV contains one Typed Wildcard FEC Element that specifies the FEC type to which the overload status notification applies. The Typed Wildcard FEC Element is defined by RFC5918 in IETF and it indicates "all FECs in a specific type". RFC5918 is incorporated herein by reference in its entirety.

While the specific flag or bit state indicative of a specific condition may be described herein as 1 or 0, ON or OFF and so on, the opposite flag or bit state may also be deemed as indicative of the specific condition in various other embodiments.

FIG. 2B depicts an exemplary LSR Overload Message format according to one embodiment. Specifically, rather than using an existing LDP Notification Message, various embodiments use a new LDP message denoted herein as an "Overload Message," which illustratively comprises seven (7) fields labeled 204-210.

In various embodiments, the Overload Message Type can be assigned from Vendor Private Message Type Space defined in RFC5036 or can be standardized from IANA. As used herein, "Notification Message" means LDP Notification Message or the new LDP Overload Message. The advantage of using a LDP LSR Overload Message is that it can carry multiple FEC TLVs as a list in order to notify overload status change for multiple FEC types together.

In various embodiments, an LSR that implements the LDP LSR Overload feature is required to determine whether a peering LSR supports overload protection or not in order to ensure backward compatibility with procedures in based RFC5036LDP specification.

In one embodiment, an LDP speaker that implements the LSR Overload Protection procedures informs its peering LSRs of such support by including a LSR Overload Protection Capability Parameter in its LDP initialization message. The Capability parameter follows, illustratively, the guidelines as defined in RFC5561, and optionally follows all Capability Negotiation Procedures defined therein. The format of the LSR Overload Protection Capability may be encoded as shown and described with respect to FIG. 2C.

FIG. 2C depicts an exemplary LSR Overload Protection Capability Parameter according to one embodiment. Specifically, in various embodiments a first (U) and second (F) bits of field 215 are set to 1 and 0 respectively such as per Section 3 of LDP Capabilities portion of RFC 5561. The remainder of field 215 may contain the LSR Overload Capability, which is the TLV code point that can be assigned from Vendor Private TLV space as defined in RFC 5036. In various embodiments, a required TLV code point may be assigned from IANA.

Thus, in various embodiments, setting the S-bit to 1 indicates that an LSR overload protection capability is being advertised.

As indicated above, the various embodiments herein described are most applicable to LSRs that operate in DU label advertisement mode and Liberal label retention Mode, though other operational modes are contemplated by the inventor. An exemplary LSR that implements the LSR overload protection follows one or more of the following procedures:

1. An LSR should not use LSR Overload notification procedures with a peer LSR that has not specified LSR Overload Protection Capability in Initialization Message received from the peer LSR.

2. When an upstream LSR detects that it is overloaded with a FEC type then it initiates a LDP Notification Message with S bit ON in LSR Overload Status TLV and a FEC TLV containing the Typed Wildcard FEC Element for the specified FEC type. The Message may be sent to one or more peers.

3. The overloaded upstream LSR may send Label Release for a set of FEC elements to respective downstream LSRs after it has notified overload status ON, to offload its LIB below certain watermark.

4. When an upstream LSR that was overloaded for a FEC type before, detects that it is no longer overloaded then it sends a LDP Notification Message with S bit OFF in LSR Overload Status TLV and FEC TLV containing the Typed Wildcard FEC Element for the specified FEC type.

5. When an upstream LSR has notified an overload status for a FEC type, then a downstream LSR should not send new Label Mappings for the specified FEC type to the upstream LSR.

6. When a downstream LSR receives LSR Overload Notification from a peering LSR with status OFF for a FEC type then the receiving LSR sends any label mappings for the FEC type that was pending to the upstream LSR or is eligible to be sent now.

7. When an upstream LSR is overloaded for a FEC type and it receives Label Mapping for that FEC type from a downstream LSR then it may send Label Release to the downstream LSR for the received Label Mapping with LDP Status Code as "No_Label_Resources". The status code that specifies "No_Label_Resources" is defined in RFC5036.

Figure 3:
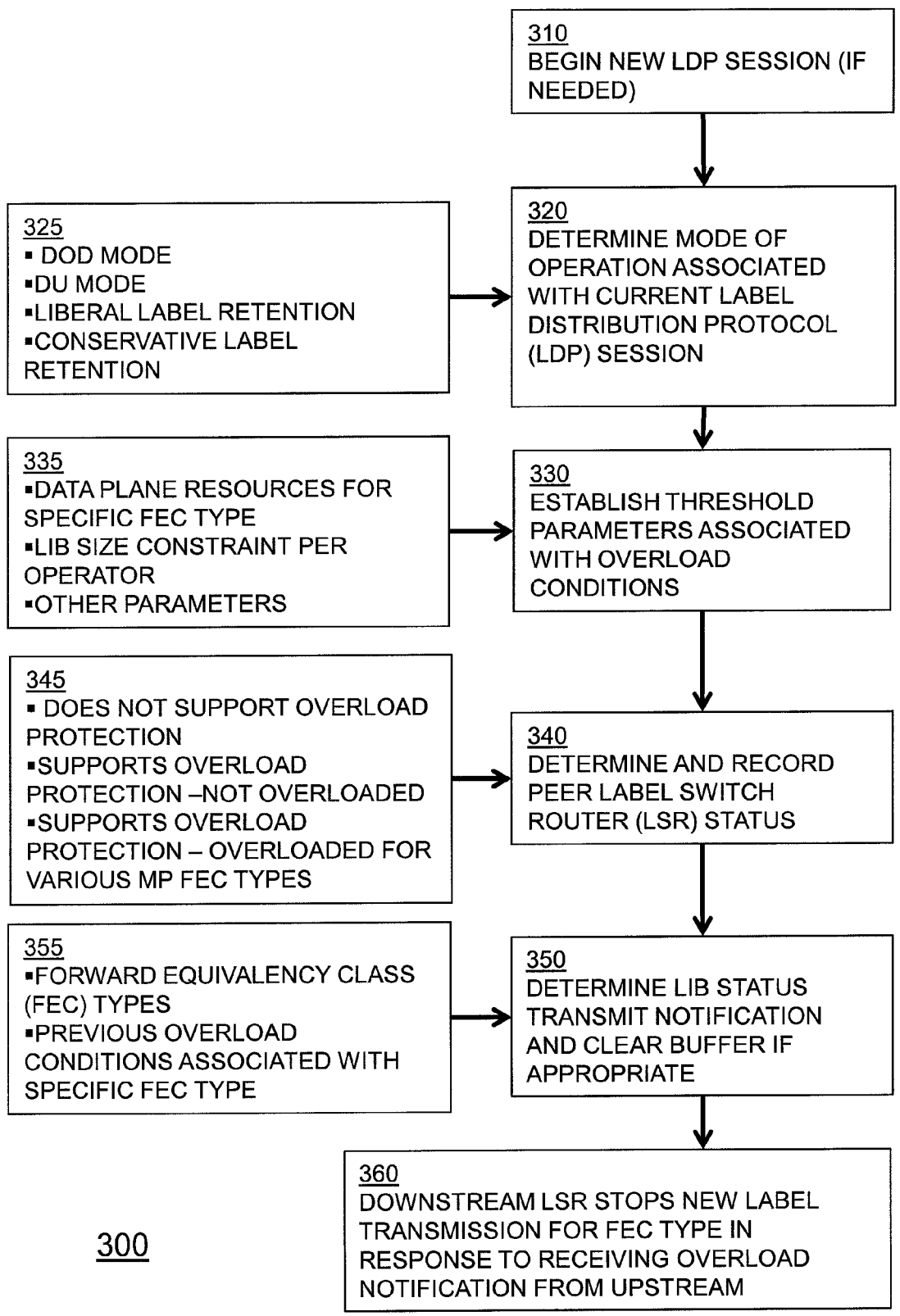
FIG. 3 depicts a flow diagram of a method according to one embodiment.

FIG. 3 depicts a flow diagram of a method according to one embodiment. Generally speaking, the method 300 of FIG. 3 provides a mechanism for LSRs to implement LDP LSR Overload Protection.

Method 300 begins at step 310 (new session if needed) and proceeds to step 320, where a LSR determines the mode of operation of a current LDP session. Referring to box 325, the modes of operation of interest for the various embodiments described herein are categorized as (1) label advertisement mode; and (2) label retention mode as previously discussed.

At step 330, the LSR establishes threshold parameters associated with overload conditions in order to signal such overload to peering LSRs. Referring to box 335, such parameters may include data plane resources for specific FEC type, LIB size constraint established by an operator and the like.

At step 340, having sent an initialization request, the upstream LSR determines and records the status of the responding LSR. Referring to box 345, the responding LSR may indicate that it does not support overload protection in which case the upstream LSR stores or records the indicated status. The responding LSR may indicate that it supports overload production and it is not currently overloaded. The responding LSR may indicate that it supports that it supports overload protection but that it is currently overloaded for various MP FEC types.

At step 350, the upstream LSR determines the LIB's status according to the different threshold parameters. Referring to box 355, such parameters may be associated with the FEC types, previous overload conditions associated with specific FEC type and the like. Further, at step 350, a notification indicating overload is propagated toward downstream LSR and the buffer associated with these operations is cleared if appropriate.

At step 360, a downstream LSR that receives the overload notification respectively stops transmitting new labels for the FEC type associated with the overload notification.

Thus, in various embodiments, a downstream LSR may advertise compliance or compatibility with the above-described LSR overload mechanisms such that an upstream LSR experiencing overload condition may indicate such condition to the downstream LSR via one or more of the mechanisms described herein. Moreover, an upstream LSR recovering from an overload condition may indicate such recovery to the downstream LSR via one or more of the mechanisms described herein.

For example, the mechanism where method for implementing an overload protection mechanism at a Label Switch Router (LSR) supporting one or more Label Switched Paths (LSPs), may comprise: in response to a determination that an overload threshold parameter associated with any of a data plane resource or a LIB (Label Information Base) resource, propagating toward downstream LSRs of the LSP a Label Distribution Protocol (LDP) message adapted to stop new label transmissions associated with the data plane resource or LIB resource. The overload threshold parameter may be associated with data plane resources for use by a specific FEC type, and the LDP message may be adapted to stop new label transmissions for the FEC type.

In various embodiments, each of a plurality of FEC types is associated with a respective priority level based on, content, owner or some other policy-based criteria, and the LDP message is adapted to preferentially select (or restrict) FEC types in order of priority. That is, some embodiments provide additional granularity in terms of selecting which traffic flows are to be adapted in accordance to LSR overload conditions.

Figure 4:
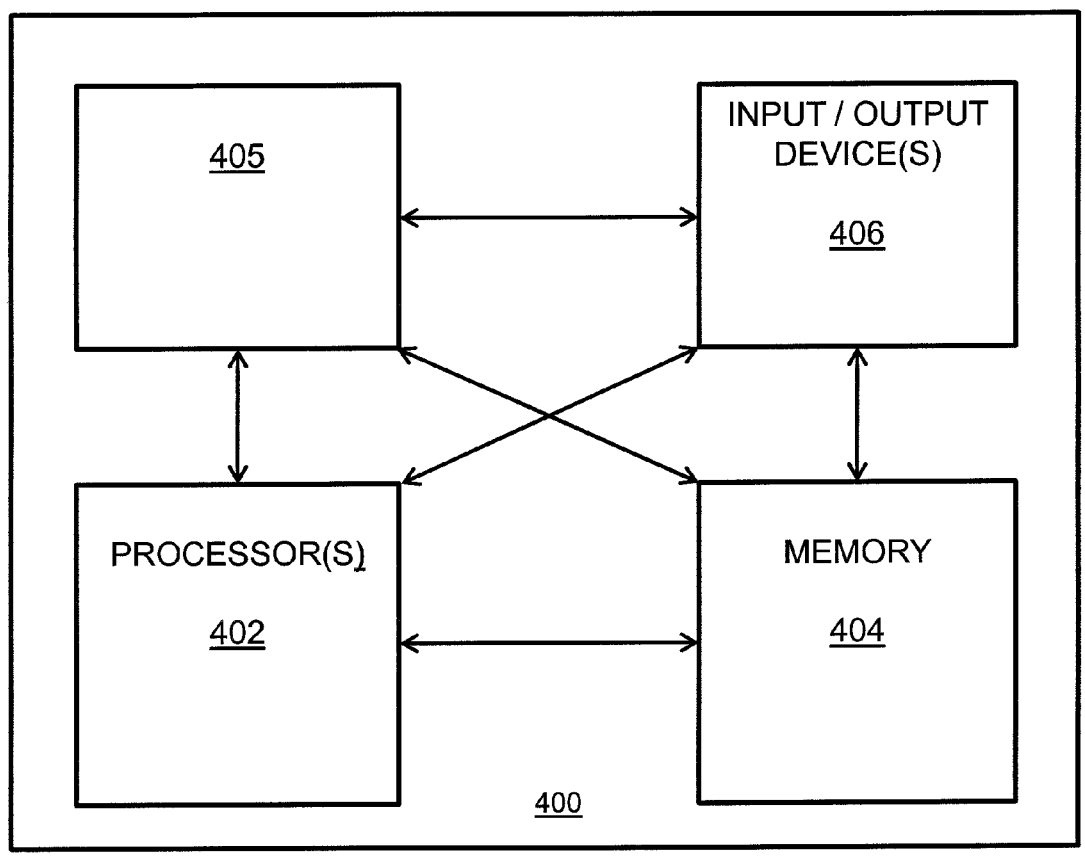
FIG. 4 depicts a high-level block diagram of a computing device, such as a processor in a telecom network elements, suitable for use in performing functions described herein.

FIG. 4 depicts a high-level block diagram of a computing device, such as a processor in a telecom network element, suitable for use in performing functions described herein such as those associated with the various elements described herein with respect to the figures.

As depicted in FIG. 4, computing device 400 includes a processor element 403 (e.g., a central processing unit (CPU) and/or other suitable processor(s)), a memory 404 (e.g., random access memory (RAM), read only memory (ROM), and the like), a cooperating module/process 405, and various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 405 can be loaded into memory 404 and executed by processor 403 to implement the functions as discussed herein. Thus, cooperating process 405 (including associated data structures) can be stored on a computer readable storage medium, e.g., RAM memory, magnetic or optical drive or diskette, and the like.

It will be appreciated that computing device 400 depicted in FIG. 4 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method for implementing an overload protection mechanism at a Label Switch Router (LSR) supporting one or more Label Switched Paths (LSPs), the method comprising:
in response to a determination that an overload threshold parameter associated with any of a data plane resource or a LIB (Label Information Base) resource is indicative of an overload condition for at least one forwarding equivalency class (FEC) type associated with a corresponding LSP, propagating toward downstream LSRs of said one or more LSPs a Label Distribution Protocol (LDP) message adapted to stop new label transmissions associated with said data plane resource or LIB resource for the at least one FEC type.

2. The method of claim 1, wherein said overload threshold parameter is associated with data plane resources for use by a specific FEC type, said LDP message adapted to stop new label transmissions for said specific FEC type.

3. The method of claim 1, wherein said overload threshold parameter is associated with data plane resources for use by multiple FEC types, said LDP message adapted to stop new label transmissions for said multiple FEC types.

4. The method of claim 1, wherein said overload threshold parameter is associated with said LIB resource, said LDP message adapted to stop new label transmissions for a selected FEC type.

5. The method of claim 4, wherein each of a plurality of FEC types is associated with a respective priority level, said LDP message being adapted to select FEC types in order of priority.

6. The method of claim 1, further comprising identifying an overload status of those LSRs supporting overload protection, wherein said LDP message is propagated toward overloaded LSRs supporting overload protection.

7. The method of claim 1, further comprising determining a mode of operation of a current LDP session, wherein said mode of operation comprises one of a Downstream On Demand (DoD) mode, a Downstream Unsolicited (DU) mode, a Liberal Label Retention mode and a Conservative Label Retention mode.

8. The method of claim 7, wherein threshold parameters associated with each of a plurality of FEC types are determined according to said mode of operation of a current LDP session.

9. The method of claim 1, wherein one or more threshold parameters include data plane resources associated with each FEC type.

10. The method of claim 1, further comprising configuring a size limit for said for one or more FEC types.

11. The method of claim 1, wherein in response to an overload condition being detected, a mechanism is invoked to determine a specific FEC type associated with the overload condition.

12. The method of claim 11, wherein when one or more LIB entries for the specific FEC type exceeds a configured threshold number, the mechanism notifies the one or more downstream LSRs of the overload condition for the respective FEC type.

13. The method of claim 12, wherein the receiving downstream LSR suspends transmission of label Mappings for the specified FEC type to originating LSR.

14. The method of claim 1, wherein in response to session initiation LDP message, the downstream LSR is adapted to respond with a message indicating a state of overload support configuration of the downstream LSR.

15. The method of claim 14, wherein the state of overload support configuration comprises no support for overload protection, support for overload protection, not overloaded or overloaded for various Multi-Point (MP) FEC types.

16. The method of claim 15, wherein in response to the state of overload protection, the downstream LSR avoids the one or more upstream LSRs that are overloaded for various MP FEC types.

17. The method of claim 1, wherein said LDP message is propagated only toward those peer LSRs associated with an LSR Overload Protection Capability.

18. The method of claim 2, further comprising:
in response to a determination that said overload threshold parameter is indicative of a recovery from said overload condition, propagating toward downstream LSRs of said LSP a Label Distribution Protocol (LDP) message adapted to release labels associated with one or more FEC elements.

19. The method of claim 1, wherein said LDP message adapted to stop new label transmissions comprises an LSR Overload type-length-value (TLV) including a status bit set to ON for an FEC type associated with said overload condition.

20. The method of claim 2, further comprising:
in response to a recovery from an overload condition associated with a particular FEC type, propagating toward downstream LSRs of said LSP a LDP Notification Message comprising an LSR Overload TLV including said status bit set to OFF for said particular FEC type.

21. The method of claim 20, further comprising:
at a downstream LSR, in response to receiving said LDP Notification Message comprising an LSR Overload TLV including said status bit set to OFF for said particular FEC type, sending any pending or eligible label mappings for the particular FEC type.

22. The method of claim 1, further comprising:
in response to receiving a Label Mapping for an FEC type from a downstream LSR, sending toward said downstream LSR a Label Release for the received Label Mapping with LDP Status Code indicative of unavailable label resources.

23. An apparatus, comprising:
a processor configured for implementing overload protection mechanism at a Label Switch Router (LSR) supporting one or more Label Switched Paths (LSPs) according to a Label Distribution Protocol (LDP); and
a storage medium for tangibly storing thereon program logic for execution by the processor, the program logic comprising:
logic to propagate, in response to a determination that an overload threshold parameter associated with any of a data plane resource or a LIB (Label Information Base) resource is indicative of an overload condition for at least one forwarding equivalency class (FEC) type associated with a corresponding LSP, toward downstream LSRs of said one or more LSPs a Label Distribution Protocol (LDP) message adapted to stop new label transmissions associated with said data plane resource or LIB resource for the at least one FEC type.

24. A non-transitory computer readable storage medium storing instructions which, when executed by a computer, adapt the operation of the computer to provide an overload protection method at a Label Switch Router (LSR) supporting one or more Label Switched Paths (LSPs), the method comprising:
in response to a determination that an overload threshold parameter associated with any of a data plane resource or a LIB (Label Information Base) resource is indicative of an overload condition for at least one forwarding equivalency class (EEC) type associated with a corresponding. LSP, propagating toward downstream LSRs of said one or more LSPs a Label Distribution Protocol (LDP) message adapted to stop new label transmissions associated with said data plane resource or LIB resource for the at least one FEC type.

25. A non-transitory computer program product wherein computer instructions stored in a non-transitory computer readable memory, when executed by a processor in a telecom network element, adapt the operation of the telecom network element to provide a method for implementing an overload protection mechanism at a Label Switch Router (LSR) supporting one or more Label Switched Paths (LSPs), the method comprising:
in response to a determination that an overload threshold parameter associated with any of a data plane resource or a LIB (Label Information Base) resource is indicative of an overload condition for at least one forwarding equivalency class (FEC) type associated with a corresponding LSP. propagating toward downstream LSRs of said one or more LSPs a Label Distribution Protocol (LDP) message adapted to stop new label transmissions associated with said data plane resource or LIB resource for the at least one FEC type.

* * * * *